United States Patent
Arntz

Patent Number: 5,832,651
Date of Patent: Nov. 10, 1998

[54] ACTUATION ASSISTING FISH GAFF

[76] Inventor: Dennis Arntz, 5755 Autumn Ridge Rd., Lake Worth, Fla. 33463

[21] Appl. No.: 577,761

[22] Filed: Dec. 22, 1995

[51] Int. Cl.$^6$ ............................................. A01K 97/14
[52] U.S. Cl. ................................... 43/5; 294/19.3; 294/26
[58] Field of Search ......................... 43/5; 294/19.3, 294/26

[56] References Cited

U.S. PATENT DOCUMENTS

| | | |
|---|---|---|
| 294,147 | 2/1884 | Poole . |
| 719,707 | 2/1903 | Williams . |
| 840,380 | 1/1907 | Savidge . |
| 886,003 | 4/1908 | Kraft ............................ 294/19.3 |
| 889,586 | 6/1908 | Cook . |
| 1,002,709 | 9/1911 | Kromann . |
| 1,187,193 | 6/1916 | Smith . |
| 1,523,517 | 1/1925 | Doty ............................ 294/19.3 |
| 1,878,951 | 9/1932 | Madison . |
| 2,191,170 | 2/1940 | Keehn et al. . |
| 2,584,881 | 2/1952 | Johnson et al. . |
| 2,789,856 | 4/1957 | Russell ............................ 294/26 |
| 3,018,579 | 1/1962 | Girden ............................ 43/5 |
| 3,194,597 | 7/1965 | Lasch, Jr. . |
| 3,208,786 | 9/1965 | Eddleman . |
| 3,219,376 | 11/1965 | Peters . |
| 3,823,971 | 7/1974 | Golden ............................ 294/26 |
| 3,833,252 | 9/1974 | Redding ............................ 43/5 |
| 3,978,605 | 9/1976 | Maruniak ............................ 43/5 |
| 5,119,585 | 6/1992 | Camp . |

FOREIGN PATENT DOCUMENTS

| | | | |
|---|---|---|---|
| 1115015 | 12/1955 | France | ............................ 43/5 |

*Primary Examiner*—Kurt Rowan
*Attorney, Agent, or Firm*—Quarles & Brady

[57] ABSTRACT

A fish gaff provides moveable, opposing gaff fangs which are reliably transitioned between a closed engagement position and an open retracted position. The fish gaff hook provides a hollow handle into which is inserted an actuating shaft. The actuating shaft is pivotally connected to the opposing gaff fangs which extend out of the hollow interior of the gaff handle through openings on the sides of the gaff handle. The side openings provide bearing surfaces for engagement and pivoting of the gaff fangs during both insertion and retraction of the gaff actuating shaft.

3 Claims, 3 Drawing Sheets

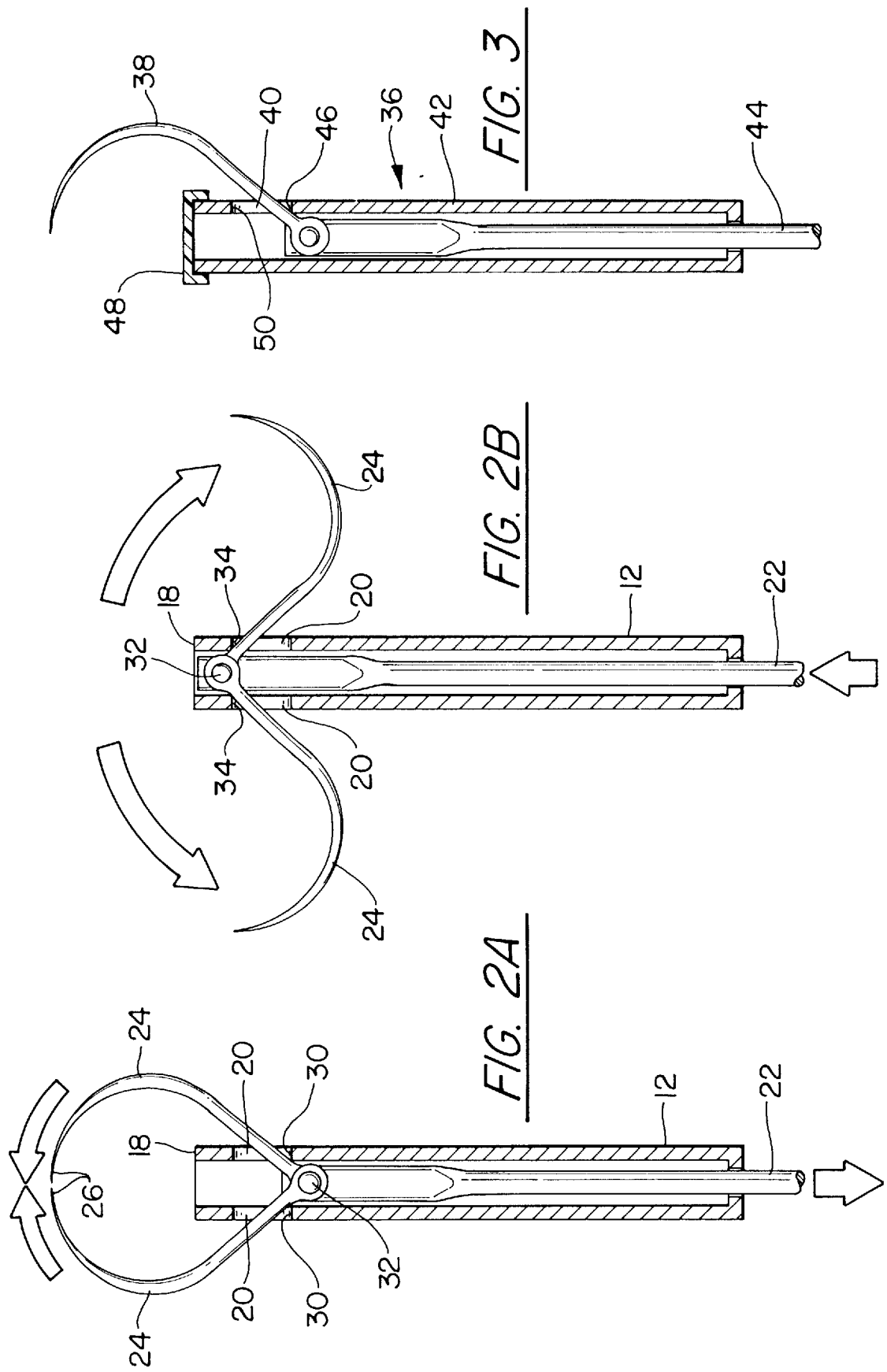

ACTUATION ASSISTING FISH GAFF

FIELD OF THE INVENTION

The invention relates generally to fish gaffs. More particularly, the invention relates to fish gaffs having moveable gaff fangs or hooks.

BACKGROUND OF THE INVENTION

For years, fishermen have been plagued with the loss of hooked fish while transferring the fish from the water to the boat or fish well. Traditionally, fishermen have used gaff hooks to secure the fish and reduce the possibility that the fish will escape by floundering and wiggling its mouth loose from the fishing hook. However, single gaff hooks that are fixed to the gaff handle are not always reliable in securely holding a fish due to their unilateral nature.

A number of double gaff hooks and grapples have been developed to further secure the fish. Because double gaff hooks approach the fish from both sides, it is generally necessary for these hooks to be moveable between open and closed positions.

A variety of mechanisms have been developed to move opposing double gaff hooks. The known designs rely heavily on spring-loaded mechanisms using linkages to forcefully transition the gaff hooks from the open to the closed position.

The use of multi-part linkages to close the gaff fangs on fish contribute to increased manufacturing costs. It would therefore be desirable to provide a system for reliably opening and closing opposing gaff hooks without the need for multi-part linkages or springs.

It would also be desirable to provide an opposing gaff hook system in which assistance in the engagement of the gaff hook is provided without the need for spring components.

The use of springs and multi-part linkages further increases the possibility of malfunction due to rust and other contamination in the highly corrosive environment of saltwater fishing. It would therefore be desirable to minimize the number of components to increase durability in saltwater conditions.

The various systems designed in the prior art for the movement of opposing gaff fangs focus on the forceful engagement of the fangs into the fish for secure holding. Unidirectional assistance creates an impediment in the opposite motion of opening the gaff fangs after the fish is otherwise secured because, for example, the force of a spring must be overcome. It would be desirable to provide a system which reliably assists in both opening and closing the gaff fangs and avoids the use of uni-directional components, such as spring assemblies.

SUMMARY OF THE INVENTION

It is therefore an object of the invention to provide a fish gaff which reliably engages and securely holds a fish while being transferred from the water.

It is another object of the invention to provide a reliable fish gaff using few parts for ease of manufacture and durable long-term performance in corrosive environments.

It is yet another object of the invention to provide a fish gaff which reliably closes to engage a fish and yet also assists the user in retraction of the gaff hooks after the fish is secured in a well or otherwise.

These and other objects of the invention are provided by an actuation and retraction assisting fish gaff having a gaff handle with an elongated hollow interior extending from an open end of the handle toward an opposite, hook end of the handle. An actuating shaft is slid through the open end into the hollow interior. The gaff handle provides one or more side openings along its side for the extension of one or more gaff fangs that are pivotally connected to the actuating shaft within the handle interior.

In operation, each gaff fang is rotated into a closed position at the hook end of the handle for engaging a fish when the actuating shaft is pulled outwardly from the interior of the gaff handle. This pulling motion causes the gaff fang to engage a first bearing surface of the side opening and thereby pivot into the closed position.

Similarly, the gaff fang is retracted into an open position when the actuating shaft is pushed into the handle. In this motion, the gaff hook engages a second bearing surface on an opposite side of the opening towards the hook end of the gaff handle and is pivoted into an open, retracted position.

The fish gaff preferably provides two gaff fangs or hooks extending through side openings on opposite sides of the gaff handle. The openings are preferably elongated slots which are dimensioned to laterally support the fangs during their pivoting motion between the open and closed positions. By utilizing dual, opposing gaff fangs, the fish is engaged on opposing sides to minimize release during gaffing and subsequent movement.

The gaff fangs are pivotally connected preferably to the end of the actuating shaft. The gaff fangs can be secured by a nut and bolt assembly extending through mounting ends of the gaff fangs and the actuating shaft. For additional lateral stability, one of the gaff fangs can provide a pair of mounting extensions forming a stirrup into which the actuating shaft and the mounting end of the other gaff fang can be positioned and secured with a bolt and nut assembly.

According to the invention, a variety of advantages are enjoyed. With the simple construction of the invention, relatively few parts are used to reliably engage a fish with forceful gaffing. Additionally, the construction of the fish gaff of the invention permits the forceful gaffing to occur by a pulling action that is further aided by the pivoting of the gaff fangs against the bearing surface of the handle openings.

The forceful gaffing results in a deeply and securely embedded gaff fang in the fish for reliable securement when the fish is transferred from the water into the craft or fish well.

The construction of the fish gaff of the invention also assists in readily releasing the gaff from the deeply embedded position. Again, the fish gaff provides leverage through the bearing surfaces of the handle openings to assist in the transition of each gaff fangs from the closed position to the open position.

The construction according to the invention also maintains reliability in the highly corrosive environment of saltwater fishing by minimizing the parts and the number of intricate components necessary to provide forceful and reliable gaffing.

BRIEF DESCRIPTION OF THE DRAWINGS

A more detailed understanding of the invention can be gained from a reading of the following detailed description in connection with the accompanying drawings, in which:

FIG. 2A is a sectional view of an embodiment of a fish gaff according to the invention, illustrating opposing gaff hooks transitioning to a closed position;

FIG. 2B is a sectional view of an embodiment of a fish gaff according to the invention as illustrated in FIG. 2A, illustrating opposing gaff fangs transitioning to an open position;

FIG. 3 is a sectional view of an embodiment of a fish gaff according to the invention, utilizing a single gaff fang;

DETAILED DESCRIPTION OF PREFERRED EMBODIMENTS

The invention relates to gaffs used for holding fish during transfer from the water. The invention is particularly concerned with fish gaffs using moveable, opposing gaff fangs or hooks that extend to engage the fish and can be retracted to an open position to release the fish when completely secured.

Figure 1:
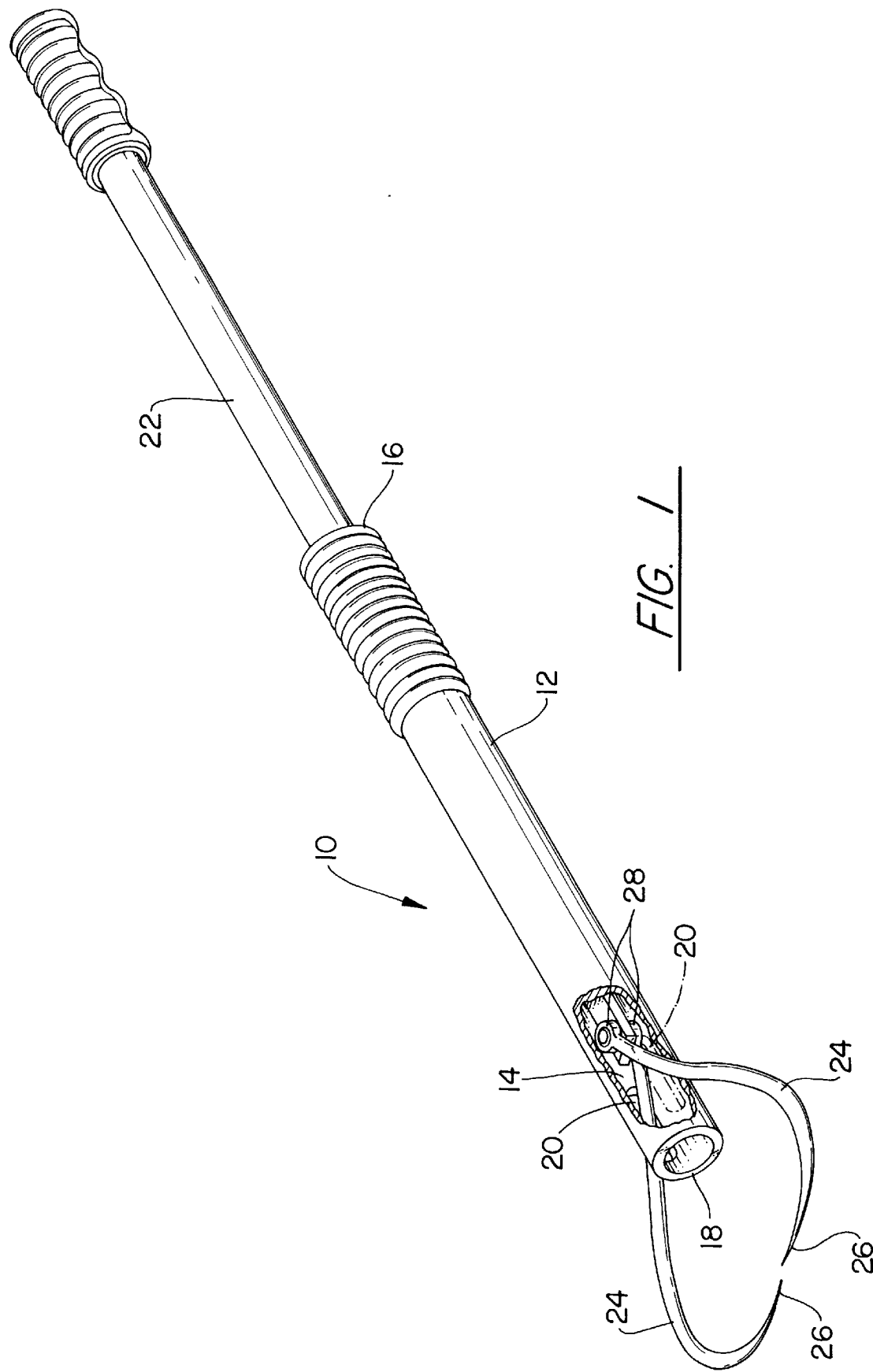
FIG. 1 is a perspective view of a preferred embodiment of a fish gaff according to the invention.

Referring to the figures and particularly to FIG. 1, a gaff 10 embodying the principles of the invention can include a fish gaff handle 12 having a hollow interior 14. The hollow interior 14 extends from an open end of the handle toward an opposite, hook end 18. The hollow interior 14 is provided at least through to side openings 20 or can extend from the open end 16 of the gaff handle 12 completely to the hook end 18 of the gaff handle 12. The hook end 18 can be capped or open as shown.

An actuating shaft 22 extends through the hollow interior 14 and is slidingly disposed for motion in and out of the hollow interior 14. One or more gaff fangs 24 extend from the outside through the side openings 20 in the gaff handle 12 for pivotal connection to the actuating shaft 22 within the handle interior 14.

The gaff handle 12 is preferably elongated and circular in cross-section. The actuating shaft 22 is similarly elongated and circular on cross-section and can be dimensioned to snugly slide within the hollow interior 14, which is also preferably circular. Other cross-sectional geometries and constructions are possible.

The gaff fangs 24 are preferably curved so that the hook ends 26 of the gaff fangs 24 generally point towards each other in the closed position, as illustrated, and can continue to a crossed position directed back towards the gaff handle 12. The mounting ends 28 of the gaff fangs 24 are also preferably curved to improve the effect of the pivotal motion of the gaff fangs 24 during actuation. The gaff fangs 24 are pivotally secured to the actuating shaft 22, preferably at its end, but can also be secured at other points along the actuating shaft 22.

The side openings 20 can be positioned at a variety of locations along the length of the gaff handle 12, depending on the desired travel of the gaff fangs 24. Preferably, the side openings 20 are positioned adjacent or near the hook end 18 of the gaff handle 12. The side openings 20 can also be dimensioned to laterally support and guide the gaff fangs 24 during their motion between the open retracted position and the closed engagement position.

Referring to FIGS. 2A and 2B, in operation, the gaff fangs 24 are driven into a closed, engagement position by a retracting motion of the actuating shaft 22 from the gaff handle 12. As used herein, retracting motion connotes a pulling of the actuating shaft in a direction out of the gaff handle, but does not require complete removal of the actuating shaft from the gaff handle.

According to the invention, the side openings 20 provide bearing surfaces 30 upon which the gaff fangs 24 are pivoted during the retraction motion of the actuating shaft 22. These bearing surfaces 30 cause the gaff fangs 24 to pivot about the pivotal connection 32 with the actuating shaft 22 and bring the hook ends 26 of the gaff fangs 24 into the closed, engagement position. This bearing surface-assisted motion results in a rapid, forceful and secure closing of the gaff fangs into a captured fish.

As shown in FIG. 2B, a similar set of bearing surfaces 34 are provided on the opposing side of the side openings 20 adjacent the hook end 18 of the gaff handle 12. When the actuating shaft 22 is pushed into the gaff handle 12 in an inserting motion, the gaff fangs 24 are pivoted about the bearing surfaces 34 into an open, retracted position, thereby releasing the fish. This bearing surface-assisted motion helps the user to readily remove the gaff fangs from the forceful secure engagement previously achieved by the fish gaff.

FIG. 3 illustrates an alternative embodiment 36, incorporating principles of the invention, in which a single gaff fang 38 is utilized. Although this construction is not preferred, it can provide many of the advantages contemplated by the invention. In this embodiment, a single side opening 40 is provided through which the single gaff fang 38 extends into a gaff handle 42 for pivotal connection to an actuating shaft 44. A retracting motion of the actuating shaft 44 from the gaff handle 42 results in a pivoting of the gaff fang 38 about a first bearing surface 46 to transition the gaff fang 38 into a closed position in front of a capped hook end 48 of the gaff handle 42. An inserting motion of the actuating shaft 44 into the gaff handle 42 pivots the gaff fang 38 into an open, retracted position upon engagement and pivoting about a second bearing surface 50.

Figure 4:
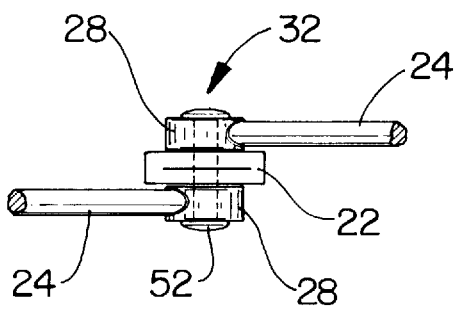
FIG. 4 is an end view of an embodiment of a pivoting assembly for use in the fish gaff according to the invention.

Referring to FIG. 4, the pivotal connection 32 of the gaff fangs 24 to the actuating shaft 22 can be provided in a variety of constructions. In one embodiment, as illustrated in FIG. 4, the mounting ends 28 of the gaff fangs 24 can be secured to the end of the actuating shaft 22 by a nut and bolt assembly 52 extending through apertures bored through each of the fangs 24 and the actuating shaft 22.

Figure 5:
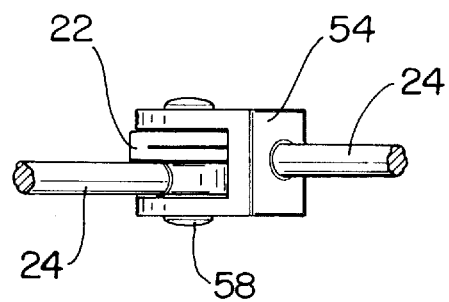
FIG. 5 is an alternative preferred embodiment of the pivoting assembly for use in the fish gaff of the invention.

A preferred embodiment of the pivotal connection between the actuating shaft 22 and the gaff fangs 24 is illustrated in FIG. 5. One of the gaff fangs 24 can provide a stirrup mounting end 54 into which the mounting end 56 of the opposing fang 24 and the actuating shaft 22 can be inserted and secured by a bolt and nut assembly 58. This construction further provides reliable positioning of the gaff fangs and minimizes loose play and lateral motion between the gaff fangs during its travel. Alternative arrangements are also possible. For example, the mounting end of the actuating shaft can provide the stirrup instead.

The fish gaff of the invention can be constructed of a variety of materials and in varying lengths and sizes. The gaff is preferably constructed of a non-corrosive metal, such as stainless steel. While a variety of lengths can be provided, it is preferable that the handle and actuating shaft be dimensioned so that a user can hold the respective ends of the actuating shaft in the handle and move the actuating shaft through the full range of motion within the user's arm span.

Although detailed discussions of preferred embodiments of the invention have been set forth above, it is intended that the scope of the invention will not be limited by such detail but, rather, that the scope of the invention will be determined in accordance with the accompanying claims.

I claim:

1. An actuation assisting fish gaff, comprising:

a gaff handle having an elongated hollow interior extending from an open end toward a hook end of said gaff handle, said gaff handle having first and second openings along its side, said first and second openings being opposed to each other and spaced from said open end and said hook end;

an actuating shaft, said actuating shaft slidingly extending through the open end into the interior of the gaff handle; and first and second gaff fangs, said first and second gaff fangs being pivotally connected to said actuating shaft within the interior of the gaff handle, said first and second gaff fangs extending through said first and second openings respectively to outside said gaff handle;

said first and second side openings each having a first bearing surface toward said open end, each first bearing surface being positioned relative to a respective one of said first and second gaff fangs for engaging said respective one of the first and second gaff fangs and pivoting said respective one of the first and second gaff fangs to a closed position toward and past the hook end of the gaff handle to forcefully engage a fish when the actuating shaft is pulled away from the hook end of the gaff handle, each of said first and second gaff fangs being curved so that free ends of said first and second gaff fangs extend toward one another in the closed position;

said first and second side openings each having a second bearing surface toward the hook end of the gaff handle, said second bearing surface being positioned relative to the respective one of said first and second gaff fangs for engaging the respective one of said first and second gaff fangs and pivoting the respective one of said first and second gaff fangs to an open position toward the open end of the gaff handle to remove said first and second gaff fangs from a fish when the actuating shaft is pushed toward the hook end of the gaff handle, whereby a forceful engagment with a fish can be obtained through leverage of the first and second gaff fangs against the first bearing surfaces and leverage of the first and second gaff fangs against the second bearing surface can be used to remove such forceful engagement.

2. The fish gaff according to claim 1, wherein the side opening is an elongated slot.

3. The fish gaff according to claim 2, wherein the width of the slot is dimensioned to laterally contact and support at least one side of said gaff fang.

* * * * *